Aug. 29, 1939.   C. A. CHAYNE   2,170,794
REMOTE CONTROL FOR TRANSMISSIONS
Filed March 14, 1938   5 Sheets-Sheet 3

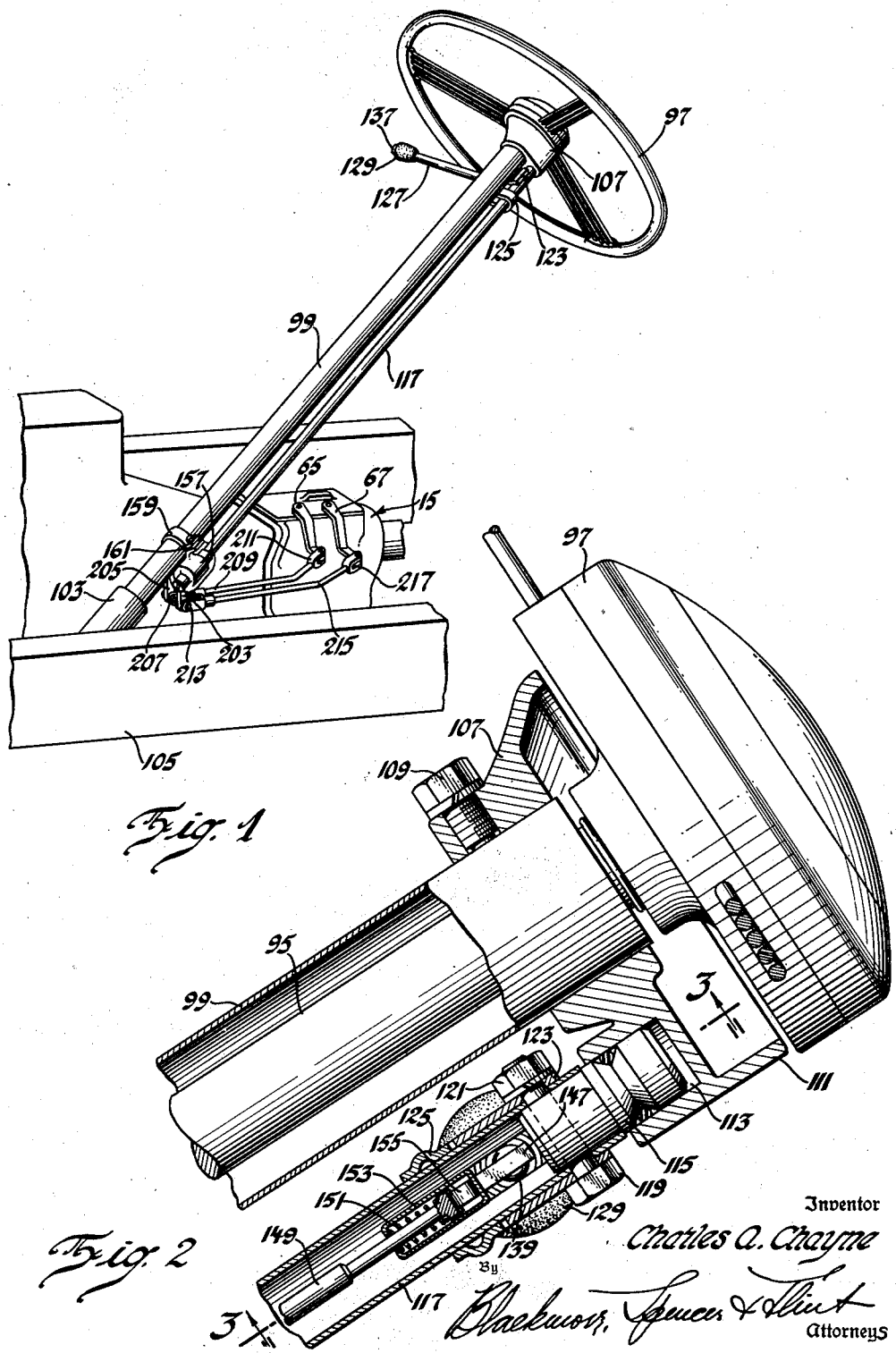

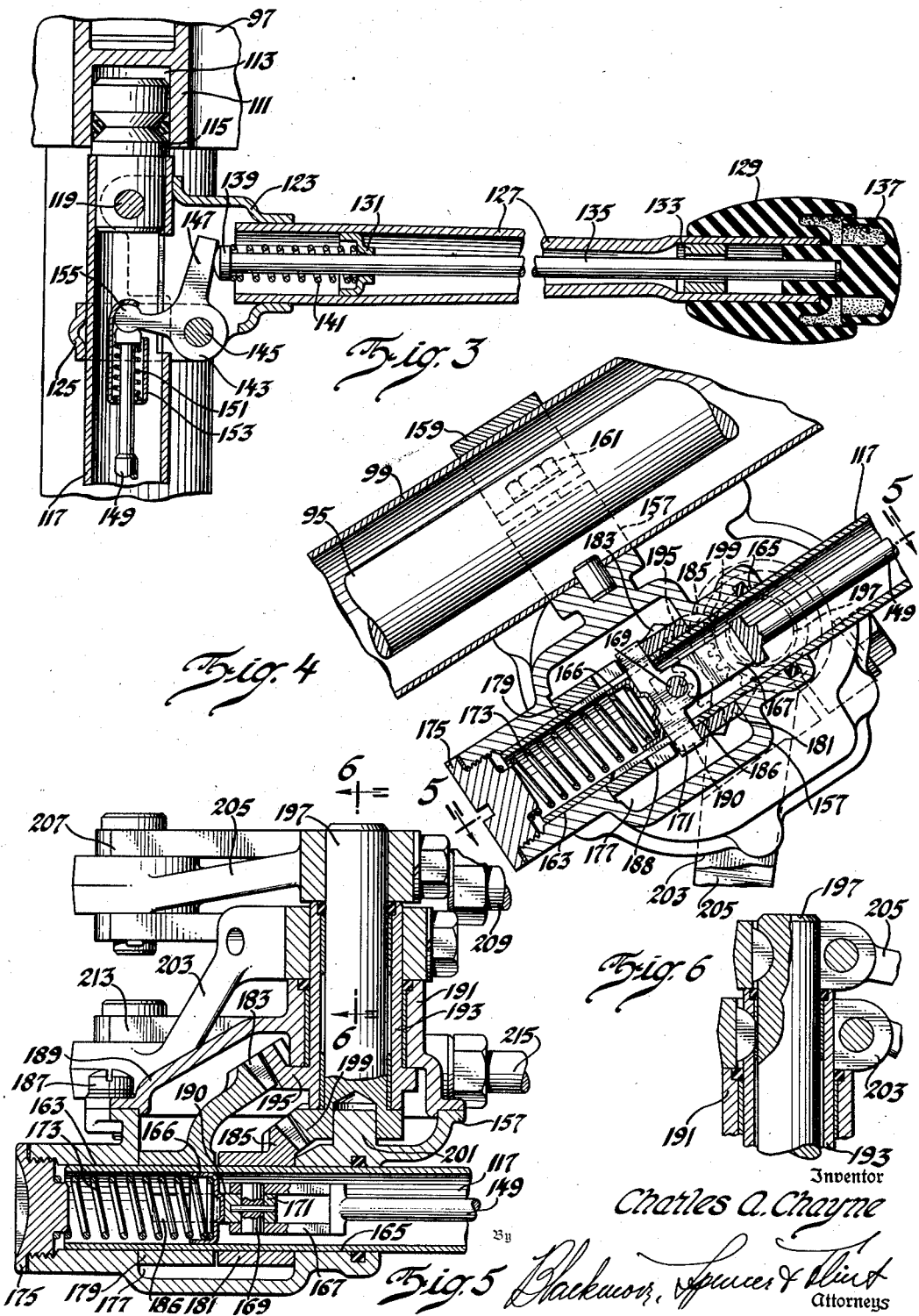

Inventor
Charles A. Chayne
By
Attorneys

Aug. 29, 1939.   C. A. CHAYNE   2,170,794
REMOTE CONTROL FOR TRANSMISSIONS
Filed March 14, 1938   5 Sheets-Sheet 4

Inventor
Charles A. Chayne
By
Blackmore, Spence & Hunt
Attorneys

Aug. 29, 1939.   C. A. CHAYNE   2,170,794
REMOTE CONTROL FOR TRANSMISSIONS
Filed March 14, 1938   5 Sheets-Sheet 5

Inventor
Charles A. Chayne
By
Blackmore, Spencer & Flint
Attorneys

Patented Aug. 29, 1939

2,170,794

UNITED STATES PATENT OFFICE 2,170,794

REMOTE CONTROL FOR TRANSMISSIONS

Charles A. Chayne, Flint, Mich., assignor to General Motors Corporation, Detroit, Mich., a corporation of Delaware Application March 14, 1938, Serial No. 195,708

6 Claims. (Cl. 74—484)

This invention relates to remote control means for the change speed mechanism of a motor vehicle.

An object of the invention is to provide manually operable means to control the change speed mechanism which shall make it possible to eliminate the objectionable shift lever projecting through the floor of the compartment occupied by the operator and one or more passengers.

Another object is to provide a manually operable lever on the steering column and adjacent the steering wheel together with mechanical connections therefrom to the movable members of the change speed mechanism.

Other objects include efficiency in operation and economy in manufacture.

In the drawings:

Figure 1 shows in perspective a part of a motor vehicle having my invention applied.

Figure 2 is a side elevation, partly broken away and in section through the upper end of the steering column and adjacent parts.

Figure 3 is a section on line 3—3 of Figure 2.

Figure 4 is a side elevation mostly broken away and in section at the lower end of the steering column.

Figure 5 is a section on line 5—5 of Figure 4.

Figure 6 is a section on line 6—6 of Figure 5.

Figure 9:
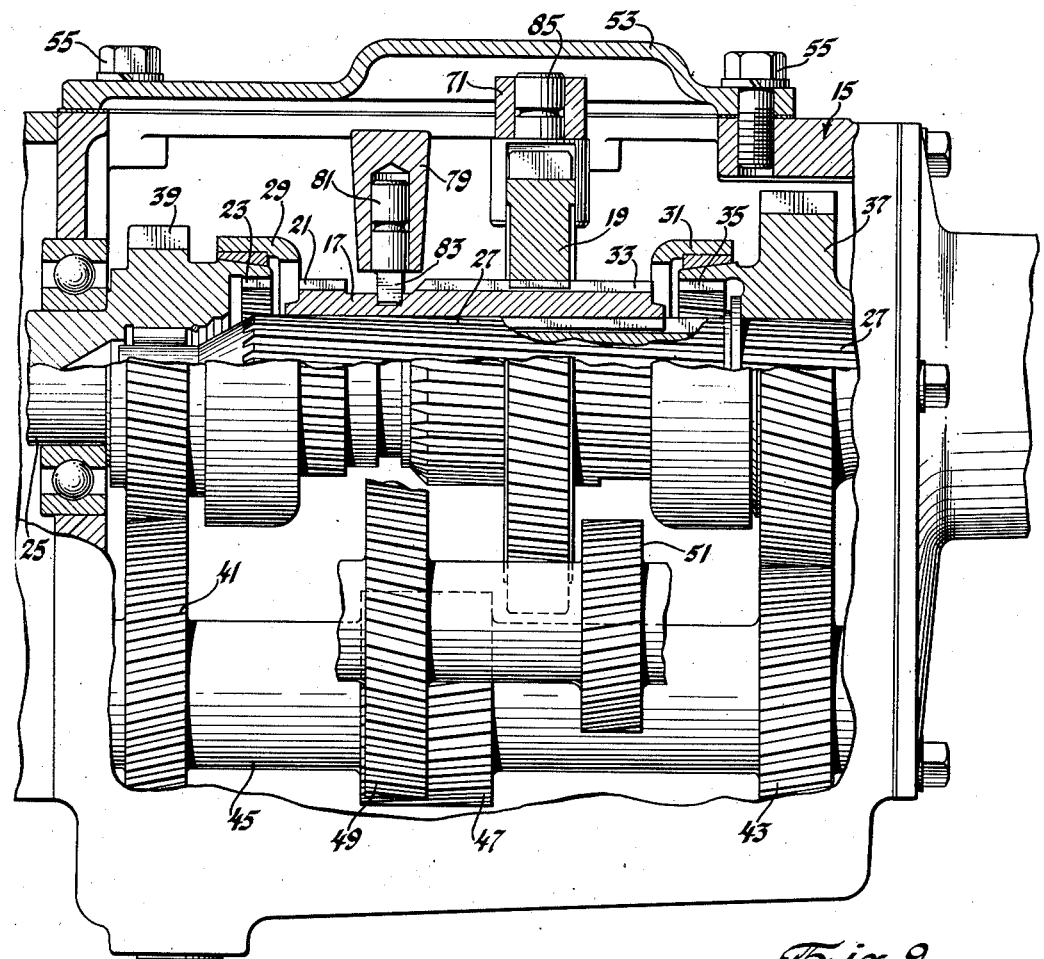
Figure 9 is a section on line 9—9 of Figure 7.

The change speed housing is identified by numeral 15. It houses conventional gearing which need not be described in detail. It includes a sleeve 17 axially slidable on but non-rotatable relative to the output shaft 27. This sleeve has external helical splines as shown. Axially slidable on the splines of sleeve 17 is a gear 19. Figure 9 shows sleeve 17 in its neutral position. If moved to the left from the position shown its clutch teeth 21 engage clutch teeth 23 on the input shaft 25 so that the input shaft 25 drives the output shaft 27 directly inasmuch as sleeve 17 is not rotatable on the driven shaft as explained above. In order that the clutch engagement may occur only when the shafts 25 and 27 are rotating at the same rate there is used conventional synchronizing means identified by numeral 29. When sleeve 17 is moved to the right from its neutral position a second synchronizer 31 and cooperating teeth 33 on the sleeve end 35 on a gear 37 serve to lock the gear 37 to the output shaft. Thereupon the output shaft is driven from the input shaft at a reduced speed by means of gears 39, 41 and 43, 37, of which gears 41 and 43 are on a countershaft 45. Gear 19, as before stated, is slidable but non-rotatable on sleeve 17. As shown by Figure 9 it is in its neutral position. If moved to the left from the position shown it meshes with a countershaft gear 47 whereupon a low speed drive is obtained through gears 39, 41 and 47, 19 as will be readily understood. Gear 47 is elongated and is in constant mesh with gear 49 of an independently mounted double idler, the other gear of the idler being marked 51. If gear 19 is moved to the right in Figure 9 from its neutral position it meshes 51. Reverse drive is then obtained through gears 39, 41; 47, 49; and 51, 19.

Figure 7:
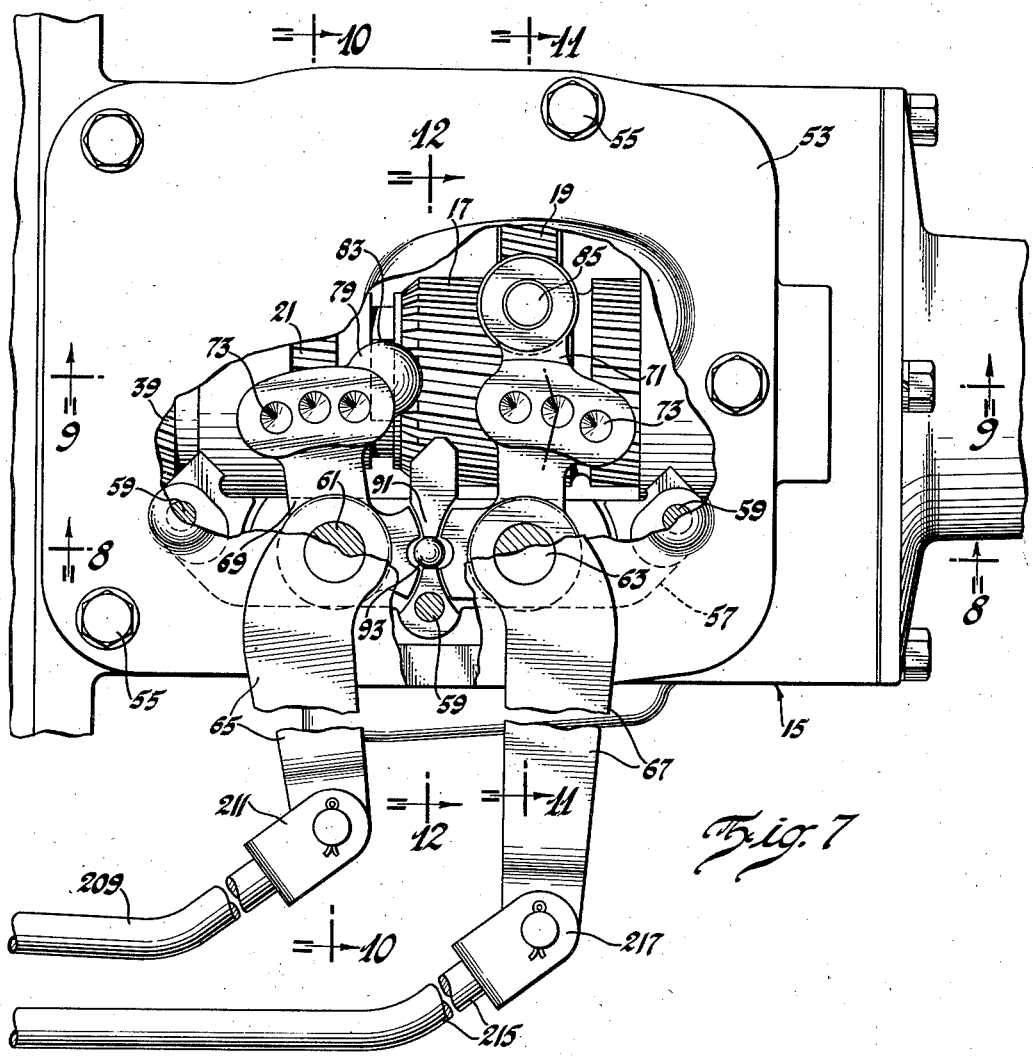
Figure 7 is a top plan view of the change speed housing, the top being broken away to show internal mechanism.
Figure 8:
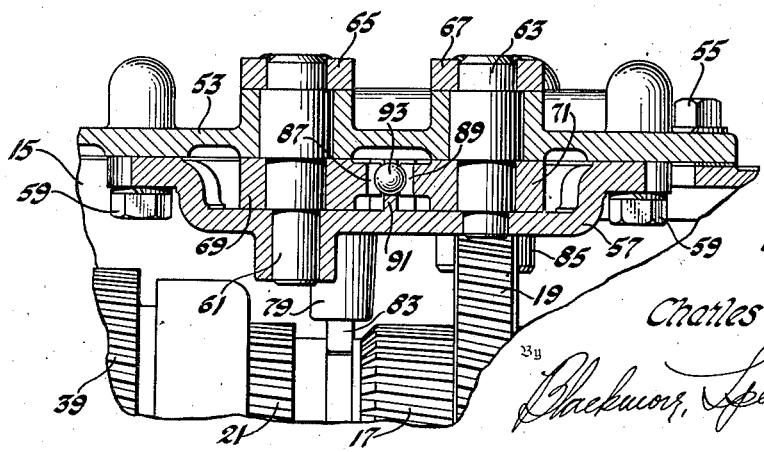
Figure 8 is a section on line 8—8 of Figure 7.
Figure 10:
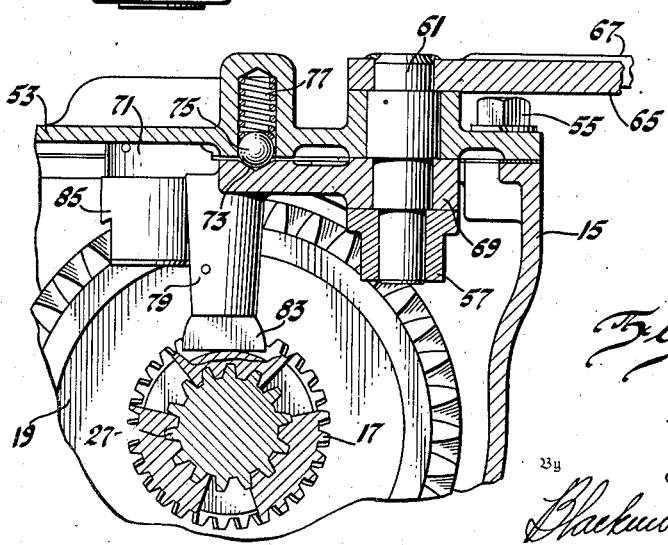
Figure 10 is a section on line 10—10 of Figure 7.
Figure 11:
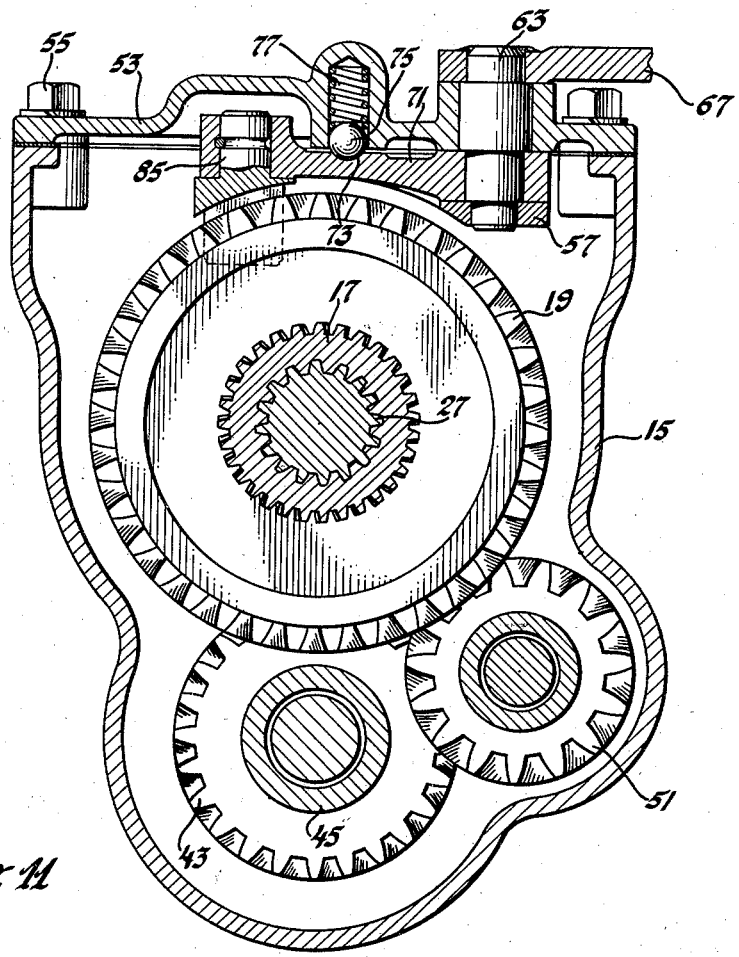
Figure 11 is a section on line 11—11 of Figure 7.
Figure 12:
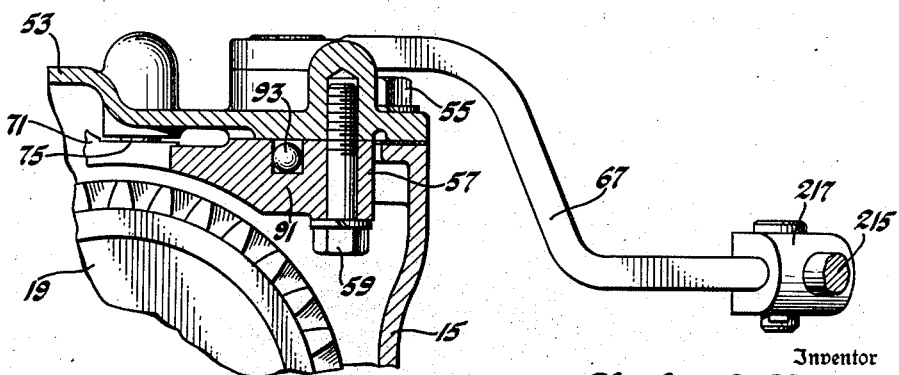
Figure 12 is a section on line 12—12 of Figure 7.

For the purpose of making the required movements of sleeve 17 and gear 19 the following construction is employed. The removable top 53 of the gear housing is secured by fastening means 55. Beneath this top or cover and adjacent one side of the gear housing is a supporting plate 57 best shown in Figure 8. This plate is secured by fastening means 59. Registering openings in the cover 53 and plate 57 rotatably support spindles 61 and 63. These spindles extend above the top 53 where they carry lever arms 65 and 67. Lever arms 69 and 71 extend from between the cover 53 and the plate 57 part way across the interior of the gear housing as shown in Figure 7. Lever 69 has three notches 73 to receive a ball 75 pressed by spring 77 seated in the cover 53, this construction constituting the equivalent of a well-known detent device for resiliently holding the lever arms in positions corresponding to the required positions of adjustment. This expedient is best illustrated by Figure 10. Lever arm 69 is extended beyond the region having the three notches and is formed at its end with a depending portion 79. This portion, best shown in Figures 9 and 10 rotatably supports a spindle 81 having at its lower end a lug 83 received within an annular channel formed in the sleeve 17. It will now be clear that the external lever arm 65 may be rotated to similarly rotate the inner lever arm 69 from a middle position wherein the sleeve 17 is inoperative to end positions where the transmission is in high speed or in second speed. In a similar manner lever 71 is provided with three notches 73, the notches being adapted to receive spring detents like those associated with lever 69, the notches being similarly marked. The end of lever 71 beyond the notches rotatably supports a stem 85, the stem being forked at its lower end to embrace gear 19. By rotation of the external lever arm 67 internal lever arm 71 is enabled to position gear 19 in its low speed position, its neutral position, or in its reverse driving position. Adjacent and between spindles 61 and 63, the levers 69 and 71 are formed with recesses 87 and 89 respectively. These recesses are directly opposite each other and in registration with an opening in the wall 91 formed on plate 57 when the two levers are in their neutral positions. When so positioned a ball 93 in the opening of wall 91 is received partly in each lever recess. When one or the other of the levers is rotated the ball is pushed from the recess of the rotated lever and deeper into the recess of the unmoved lever. This device serves as the conventional locking expedient to prevent the rotary movement of the two levers simultaneously.

The uppermost end of the steering post 95 is equipped with a hand steering wheel 97. The post 95 is housed within a tubular steering column 99. The column extends to a lower end 103 near the frame member 105. To the upper end of the column is secured a hollow bracket 107 by a suitable fastener 109. The bracket is extended radially from the column as at 111 and recessed at 113 to form a rotary bearing support for a spindle 115. A hollow shaft 117 is secured to the spindle 115 by a bolt 119 and a nut 121. A bracket 123 is held by a lower part 125 embracing the tubular shaft 117 and an upper arm secured to the shaft 117 by the aforesaid fastening means 119. Rigidly secured to the bracket 123 is a tubular lever 127. The lever terminates with a grip 129 of rubber or the like. Within the lever 127 are guides 131 and 133 for a reciprocable rod 135 terminating in a grip 137 which may be of rubber or the like. Rod 135 has a head 139 and an anti-rattling spring 141 is located between the head and the guide 131. A bell crank lever 143 is pivoted at 145 within an opening of the bracket 123. One arm 147 of the lever is in contact with the head 139. Reciprocable through the hollow shaft 117 is a rod 149. A spring 151 is located within a housing 153, the spring engaging the housing and a head on the end of rod 149. The housing is extended upwardly and partially embraces the second arm 155 of the bell crank lever. By this means the head of the rod 149 and the second arm of the bell crank lever are resiliently held in contact. At the lower end of the steering column is a bracket 157 suitably secured thereto by means of a cap 159 and locking means 161. The bracket journals the lower end of the tubular shaft 117, the bearing surface being identified by numerals 163 and 165. Within the lower end of the tubular shaft 117 the shaft 149 is forked and to the furcations 167 is pivoted by pin 169 a cross head 171. A spring 173 is placed between a cap 175 threaded into the extreme end of the bracket 157 beyond the bearing 163 and an abutment 166 engaging the cross head. As shown by Figure 4 the bracket is hollow and forms a recess 177 between the bearing portions 163 and 165. Rotatable about the shaft 117 and within the recess 177 are hubs 179 and 181 of bevel gears 183 and 185 respectively. Secured to the bracket 157 at 187 adjacent the opening to the recess 177 is a hollow cap 189. The enclosure formed jointly by the recess 177 of the bracket and the chamber of the cap 189 houses the bevel gears 183 and 185. Cap 189 is formed at 191 to serve as a journal bearing for a shaft 193, the latter being tubular and formed with beveled gear teeth 195 to mesh with the teeth of bevel gear 183. Within shaft 193 is a solid shaft 197 having at its end a bevel gear 199 in mesh with bevel gear 185. The shaft 197 may be centered by a stem 201 formed on the bracket 157 and piloted into an opening in the end of the shaft. Suitable bearing sleeves may be used for the shafts and such sleeves are shown on the drawings. Tubular shaft 193 projects beyond the bearing therefor in the cap 189 and to its projecting end is secured the hub of a lever 203. Shaft 197 extends beyond the end of shaft 193 and carries secured thereto the hub of a lever 205.

The cross head 171 is longer than the diameter of the tubular shaft 117 and projects through slots 186 therein and also into notches 188 or 190 of the hubs 179 and 181 respectively so that one or the other of the bevel gears may be made rigid with the shaft 117. Normally spring 173 holds the cross head 171 upwardly and locks the hub 181 to the shaft 117.

Forks 207 of a link 209 are connected to lever 205. The other end of this link is connected at 211 to the lever 65. Forked ends 213 of a link 215 are connected to lever 203. The other end of link 215 is connected to the lever 67 at 217.

In the operation of the device it will be evident that shaft 117 may be rotated by the hand lever 127 in either direction about its longitudinal axis. In so rotating the hand lever, and because spring 173 serves to lock the hub 181 of beveled gear 185 to the shaft 117, the beveled gear 199 rotates shaft 197.

The rotation of shaft 197 operates to rotate lever arm 65 by means of the before mentioned connecting linkage. By this means sleeve 17 is shifted to its neutral position or to positions for driving in high speed or in second speed. If the button 137 is pushed inwardly it operates through the instrumentality of rods 135 and 149 to move the cross head 171 downwardly against the tension of spring 173. This releases hub 181 and locks the hub 179. Thereafter a rotation of the hollow shaft 117 about its axis by means of the hand lever 127 functions in an obvious manner to make shifts to low speed, to neutral or to reverse. The locking device 93 insures the rocking of but one of the levers 69 or 71 at one time. The detents resiliently hold the levers in positions of adjustment.

I claim:

1. In combination with a vehicle change speed mechanism and a steering column, a tubular shaft journaled for rotation adjacent said column, levers adjacent said change speed mechanism movable to effect selected driving ratios, manually operable means to rock said tubular shaft, a plurality of first gears rotatably mounted on said tubular shaft, cooperating secondary gears adapted to be rotated by said first named gears, mechanism whereby rotation of said secondary gears moves said levers, means within said tubular shaft and including a part movable longitudinally relatively to said tubular shaft to lock a selected one of said first named gears to the hollow shaft and means adjacent said manually operated means to move said movable gear locking means.

2. In combination with a vehicle change speed mechanism and a steering column, a tubular shaft journaled for rotation adjacent said column, levers adjacent said change speed mechanism movable to effect selected driving ratios, manually operable means to rock said tubular shaft, a plurality of first gears rotatably mounted on said tubular shaft, cooperating secondary gears adapted to be rotated by said first named gears, mechanism whereby rotation of said secondary gears moves said levers, means within said tubular shaft and including a part movable longitudinally relatively to said tubular shaft to lock a selected one of said first named gears to the hollow shaft and means adjacent said manually operated means to move said movable gear locking means, all of said gears being beveled gears, the gears mounted to rotate on the tubular shaft having slotted hubs and said movable gearing locking means comprising a cross head extended through slotted parts of said tubular shaft and into one or another of said slots of said hubs.

3. In combination with a vehicle change speed mechanism and a steering column, a tubular shaft journaled for rotation adjacent said column, levers adjacent said change speed mechanism movable to effect selected driving ratios, manually operable means to rock said tubular shaft, a plurality of first gears rotatably mounted on said tubular shaft, cooperating secondary gears adapted to be rotated by said first named gears, mechanism whereby rotation of said secondary gears moves said levers, means within said tubular shaft and including a part movable longitudinally relatively to said tubular shaft to lock a selected one of said first named gears to the hollow shaft and means adjacent said manually operated means to move said movable gear locking means, said last named means comprising a first rod reciprocable through said manually operable means, a second rod extending axially through said tubular shaft and connections between said rods whereby the reciprocation of one reciprocates the other and said movable gear locking means carried by the second rod.

4. In combination with a vehicle having change speed transmission and a steering column, a plurality of brackets carried by said column, a tubular rockshaft journaled for rotation in said brackets, a manually operable lever rigid with the upper end of said tubular shaft, beveled gears rotatably mounted upon the lower end of said tubular shaft, connections whereby rotation of said gears may change the ratio of said change speed transmission jointly reciprocable rods within said manually operable lever and said tubular shaft, said tubular shaft having diametrically opposite slots adjacent said beveled gears and said beveled gears having slotted hubs, a cross head within said tubular shaft, extending through the slots thereof and movable axially to engage within the slot of the one or the other of said beveled gears, said cross head being carried by the reciprocable rod of the tubular shaft, and a manually operable terminal button carried by the end of the rod within the manually operable lever.

5. The invention defined by claim 4, together with yieldable means to bias said cross head into engagement with a selected one of said gears.

6. The invention defined by claim 4, together with a bell crank pivoted at the junction of said tubular shaft and said manually operable lever and having its arms in contact with the adjacent ends of said rods.

CHARLES A. CHAYNE.